United States Patent
Jhamnani et al.

(10) Patent No.: US 7,342,939 B2
(45) Date of Patent: Mar. 11, 2008

(54) METHOD AND APPARATUS FOR PREDICTIVELY PROVIDING AN UPLINK COMMUNICATION RESOURCE

(75) Inventors: Alok H. Jhamnani, Schaumburg, IL (US); Satyen D. Barve, Palatine, IL (US); Pramod Karnam, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 614 days.

(21) Appl. No.: 11/016,181

(22) Filed: Dec. 17, 2004

(65) Prior Publication Data

US 2006/0133331 A1 Jun. 22, 2006

(51) Int. Cl.
*H04J 3/16* (2006.01)
*H04J 3/22* (2006.01)

(52) U.S. Cl. .................. 370/468; 370/329; 370/341

(58) Field of Classification Search ............... 370/329, 370/341, 368, 338, 431, 465, 428; 455/450, 455/452.1, 452.2
See application file for complete search history.

(56) References Cited

U.S. PATENT DOCUMENTS 6,996,083 B1 * 2/2006 Balachandran et al. ..... 370/337
2004/0252661 A1 * 12/2004 Lintulampi et al. ......... 370/329
2005/0105479 A1 * 5/2005 Vanttinen et al. ........... 370/278
2005/0180325 A1 * 8/2005 Niemela et al. ............. 370/230
2007/0201396 A1 * 8/2007 Hautamaki et al. ......... 370/329

\* cited by examiner

*Primary Examiner*—Ajit Patel

(57) ABSTRACT

Various embodiments are described to address the need for an apparatus and method for providing uplink communication resources that reduce some of the existing delays in acquiring these resources. In general, they may involve a RAN (121) transmitting data to a remote unit (101) via a downlink communication resource. After transmitting the data and with no additional data ready for transmission, the RAN begins transmitting assignment messages to the remote unit for an uplink resource. However, these assignment messages are not transmitted in response to uplink resource requests from the remote unit. In addition to or alternatively, the RAN detects a regular pattern in uplink activity of the remote unit and then begins predicting, based on the pattern, when the remote unit will next need an uplink resource. When the remote unit is predicted to need an uplink resource, the RAN transmits an assignment message to the remote unit.

14 Claims, 4 Drawing Sheets

METHOD AND APPARATUS FOR PREDICTIVELY PROVIDING AN UPLINK COMMUNICATION RESOURCE

REFERENCE(S) TO RELATED APPLICATION(S)

This application is related to a co-pending application entitled "METHOD AND APPARATUS FOR DETERMINING WHEN TO BEGIN COMMUNICATION RESOURCE ACQUISITION," filed on even date herewith, assigned to the assignee of the present application, and hereby incorporated by reference.

FIELD OF THE INVENTION

The present invention relates generally to communication systems and, in particular, to predictively providing uplink communication resources.

BACKGROUND OF THE INVENTION

A Temporary Block Flow (TBF) is a logical connection used by two General Packet Radio Service (GPRS) entities to support the unidirectional transfer of lower layer compatibility (LLC) protocol data units (PDUs) on packet data physical channels (PDCHs)(or timeslots). In a typical GPRS system, the network needs to establish a downlink (DL) TBF to transfer data in the DL direction and an uplink (UL) TBF to transfer data in the UL direction. TBFs are typically short-lived and are generally only active during data transfers.

FIG. 2 is an exemplary, prior-art signaling flow diagram that depicts UL TBF release and establishment signaling during an active DL TBF. A mobile station (MS) with an active downlink TBF, requests uplink resources by sending a channel request to the network as a part of a Packet Downlink Ack/Nack (PDAK) message. The PDAK message is also used to acknowledge the radio link control (RLC) data blocks received in the downlink direction. The network solicits a PDAK message by setting the "poll" bit in a DL RLC data block. The network, or packet control unit (PCU), sends the mobile a Packet Uplink Assignment (PUA) message to assign resources for an uplink TBF. The PUA contains a timeslot allocation for the MS's uplink TBF. The MS can then start sending uplink RLC data blocks on the timeslot(s) allocated in PUA.

The MS initiates the release of the uplink TBF by beginning the countdown process (as described in 3GPP specification 04.60, sub clause 9.3.1). During an uplink TBF, when the mobile station has only BS_CV_MAX number of blocks remaining to be transmitted in this TBF, the mobile station decrements the Countdown Value (CV) in the RLC/MAC data block header of each subsequent RLC data block sent to the network until the mobile sends the last RLC data block with CV=0.

If the network has received all the RLC data blocks when it detects the end of the TBF (i.e., when CV=0), it will send the Packet Uplink Ack/Nack (PUAK) message with the Final Ack Indicator bit set to '1'. When the received PUAK message has the Final Ack Indicator bit set to '1', the mobile station shall transmit the Packet Control Acknowledgment (PCA) message and release the TBF.

In existing GPRS systems, if the mobile has a limited amount of data to send to the network, it establishes a UL TBF and starts counting down soon after it reaches BS_CV_MAX number of blocks remaining to be transmitted. The count down mechanism allows the network to realize that the uplink data transfer is ending and allows the network to better utilize uplink resources. However, once the mobile starts its countdown procedure, it cannot append more RLC data blocks (than it originally intended for this TBF) with new data into the same uplink TBF. In order to send any new data, the mobile needs to terminate the present UL TBF and re-establish a new UL TBF after the current TBF is terminated.

In existing GPRS systems, UL TBF establishment delays (during a DL TBF) are costly, ranging from 180 ms to 360 ms depending on the round-trip delay between the base transmitter station (BTS) and the base station controller (BSC)/PCU. In multiple wireless application protocol (WAP)-type GPRS sessions, several UL TBFs are established, typically during ongoing DL TBFs. Each such UL TBF suffers the round-trip delay. However, when poor wireless conditions are prevalent, the delays experienced can exceed 5 seconds. This can occur when UL requests, during an ongoing DL TBF, are lost because of the poor wireless conditions. Subsequent requests may not be sent for over 5 seconds, causing a serious delay in UL traffic.

Therefore, a need exists for an apparatus and method for providing uplink communication resources that reduce some of the existing delays in acquiring these resources.

Specific embodiments of the present invention are disclosed below with reference to FIGS. 1 and 3-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to address the need for an apparatus and method for providing uplink communication resources that reduce some of the existing delays in acquiring these resources. In general, they may involve a RAN transmitting data to a remote unit via a downlink communication resource. After transmitting the data and with no additional data ready for transmission, the RAN begins transmitting assignment messages to the remote unit for an uplink resource. However, these assignment messages are not transmitted in response to uplink resource requests from the remote unit. In addition to or alternatively, the RAN detects a regular pattern in uplink activity of the remote unit and then begins predicting, based on the pattern, when the remote unit will next need an uplink resource. When the remote unit is predicted to need an uplink resource, the RAN transmits an assignment message to the remote unit.

Figure 1:
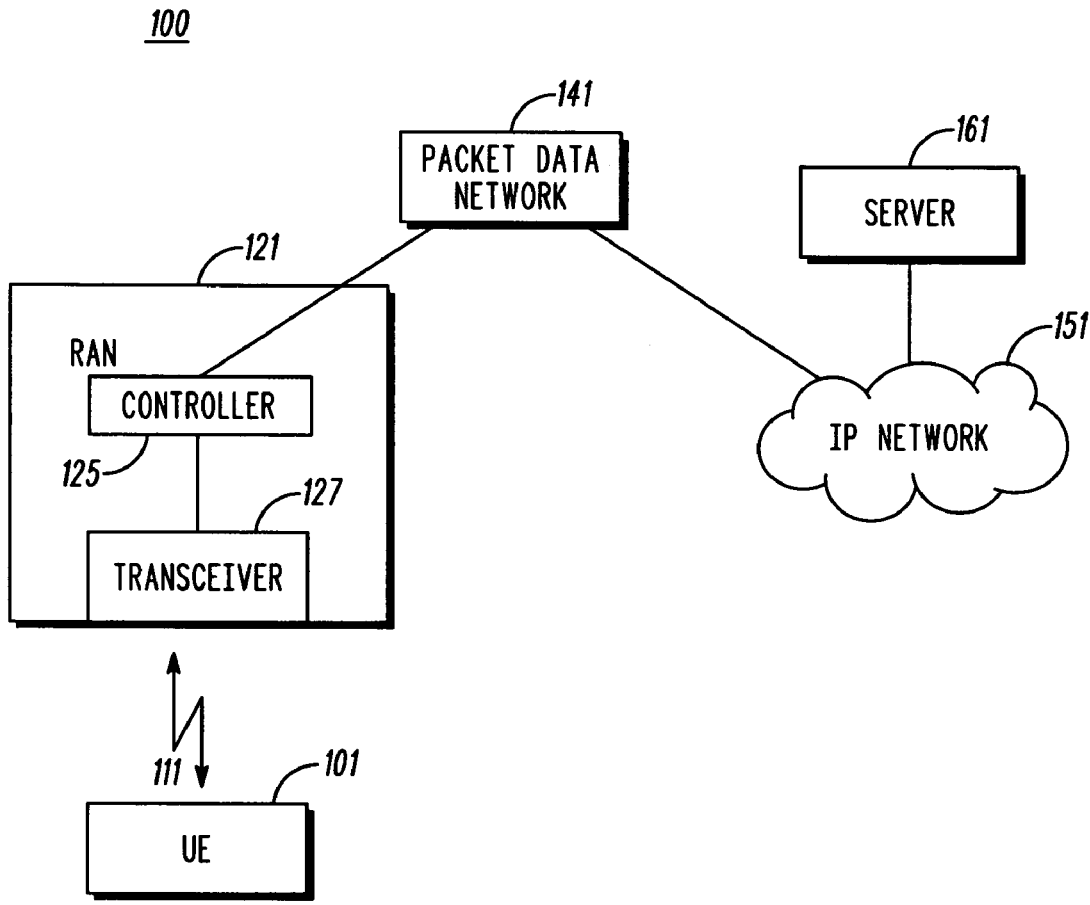
FIG. 1 is a block diagram depiction of a wireless communication system in accordance with multiple embodiments of the present invention.

The disclosed embodiments can be more fully understood with reference to FIGS. 1 and 3-5. FIG. 1 is a block diagram depiction of a wireless communication system 100 in accordance with multiple embodiments of the present invention. Communication system 100 represents a system having an architecture in accordance with the GPRS specifications described in the 3GPP (3rd Generation Partnership Project, which may be contacted via http://www.3gpp.org/) standards, suitably modified to implement the present invention. Alternative embodiments of the present invention may be implemented in communication systems that employ other (or additional) architectures/technologies such as, but not limited to, others specified in 3GPP (EDGE and UMTS, e.g.), those specified in the 3GPP2 (3rd Generation Partnership Project 2, which may be contacted via http://www.3gpp2.com/) standards (IS-2000, e.g.), High Rate Packet Data (HRPD, which is also referred to as DO or IS-856) standards, High Speed Downlink Packet Access (HSDPA) standards, and/or the IEEE's 802.11, 802.16 or 802.20 standards.

More specifically, communication system 100 comprises user equipment (UE) 101, radio access network (RAN) 121, packet data network 141, IP (internet protocol) network 151, and server 161. Those skilled in the art will recognize that FIG. 1 does not depict all of the network equipment necessary for system 100 to operate but only those system components and logical entities particularly relevant to the description of embodiments herein. For example, packet data networks are known to comprise devices such as Serving GPRS Support Nodes (SGSNs) and Gateway GPRS Support Nodes (GGSNs). Also, RANs are known to comprise devices such as base transceiver stations (BTSs), access points (APs), packet control units (PCUs), base site controllers (BSCs), and/or radio network controllers (RNCs), depending on which technology is employed. However, none of these are specifically shown in FIG. 1.

Instead, RAN 121 is depicted in FIG. 1 as comprising controller 125 and transceiver 127. In general, components such as RAN controllers and RAN transceivers are well-known. For example, RAN controllers are known to comprise basic components such as, but not limited to, microprocessors, memory devices, network interface circuitry, and/or logic circuitry. Such RAN components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, a call flow, and/or a protocol specification, those skilled in the art are aware of the many design and development techniques available to implement a RAN that performs the given logic. Furthermore, those skilled in the art will recognize that aspects of the present invention may be implemented in and across various physical components and none are necessarily limited to single platform implementations. For example, the RAN aspect of the present invention may be implemented in a base transceiver station, in a base/packet controller, or across both a base transceiver station and a base/packet controller.

Thus, RAN 121 represents a known RAN that has been adapted, in accordance with the description herein, to implement multiple embodiments of the present invention. Furthermore, controller 125 and transceiver 127 is not intended to precisely correspond to a base/packet controller and base transceiver station, respectively. Rather, controller 125 and transceiver 127 each represent devices that can extend across separate physical components that perhaps are not even co-located.

A remote unit/user equipment is known to refer to a wide variety of consumer electronic platforms such as, but not limited to, mobile stations (MSs), access terminals (ATs), terminal equipment, gaming devices, personal computers, personal digital assistants (PDAs), cable set-top boxes and satellite set-top boxes. RAN 121 uses a 3GPP air interface such as a standard GPRS air interface for communication with UE 101. Thus, air interface 111 comprises uplink and downlink channels in accordance with the applicable GPRS specification. For purposes herein, a generic uplink and downlink will be referred to with respect to air interface 111, since the embodiments discussed do not depend on channel types more particularly defined. In this way, the description can be simplified and made more clear to a person of skill in the art.

Operation of various embodiments in accordance with the present invention occur substantially as follows. Common among the applications used over GPRS are transaction-based applications or multiple WAP-type applications. While running such applications, a UE repeatedly sends UL data via a UL TBF and repeatedly receives responses via a DL TBF. This communication pattern often continues until the application is ended. Some GPRS networks use a delayed DL TBF release (DDTR) procedure to keep a DL TBF active after all the data has been sent. With no data to send via the DL TBF, these networks send "dummy" RLC data blocks. By sending these "dummy" RLC data blocks, the UE is given an opportunity to request the establishment of a UL TBF during the active DL TBF.

Figure 3:
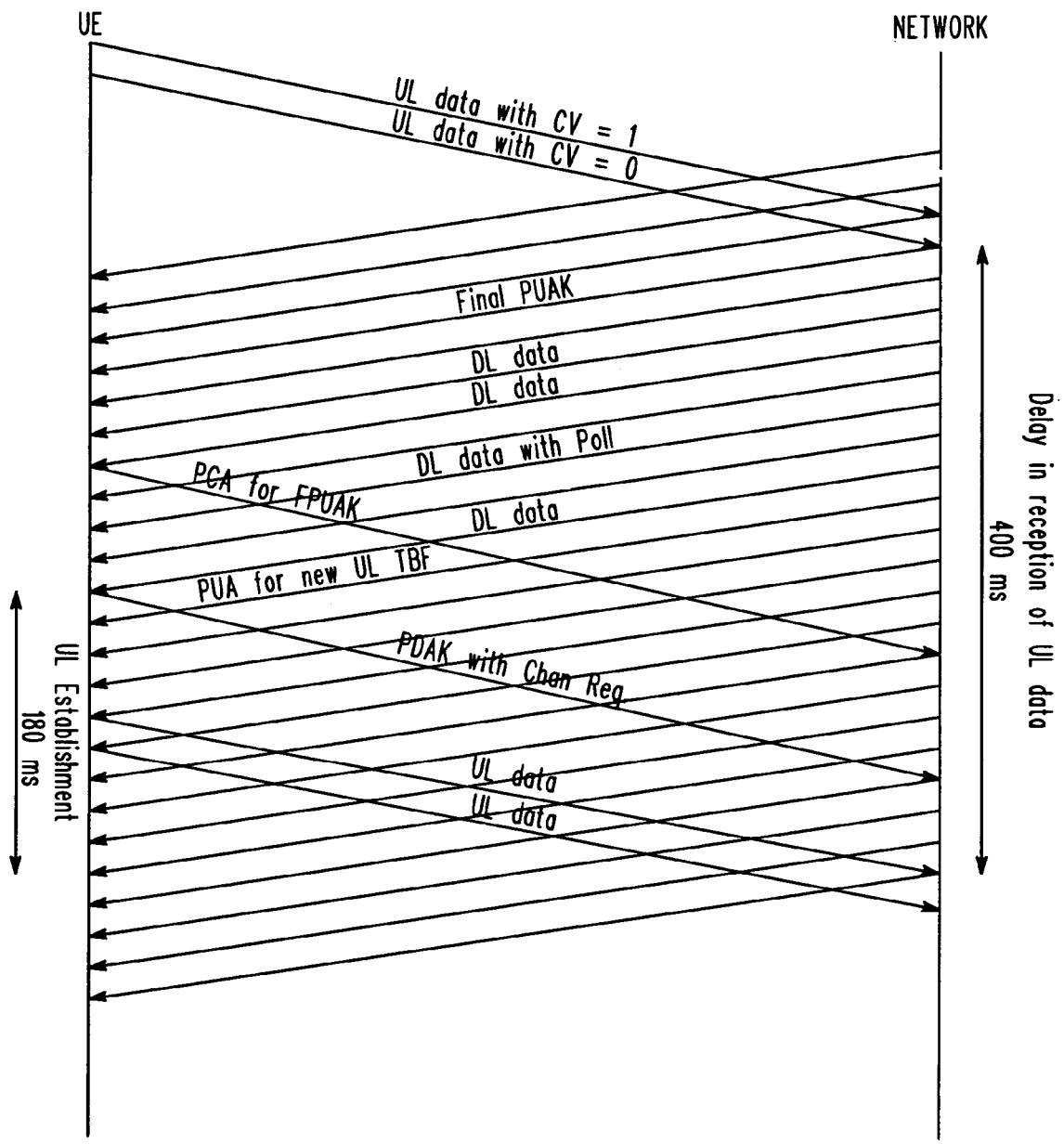
FIG. 3 is an exemplary signaling flow diagram that depicts UL TBF release and establishment signaling during an active DL TBF, in accordance with multiple embodiments of the present invention.

FIG. 3 is an exemplary signaling flow diagram 300 that depicts UL TBF release and establishment signaling during an active DL TBF, in accordance with multiple embodiments of the present invention. While releasing a UL TBF, the network sends a Final Packet Uplink Ack/Nack (PUAK) to acknowledge all UL RLC data blocks (up to the block containing a countdown value of zero) that it has received for that TBF. After the Final PUAK has been sent to the UE, each Packet Downlink Ack (PDAK) solicited from the UE by the network, has the potential to contain a channel request for the next UL TBF. After all the data has been sent via the DL TBF, the network begins the DDTR procedure. In contrast to the prior art, some embodiments of the present invention have the network send frequent PUAs to the UE. In practice, the network has no real data to send via the DL TBF, so the network sends packet uplink assignments to the UE. If the UE has not requested a UL TBF, it may disregard the unrequested assignments.

However, the network can send a PUA for a UL TBF such that it reaches the UE soon after a PDAK (which potentially contains a channel request) has been sent by the UE. That is, the network can send a PUA after polling for the PDAK. Potentially, this would enable the UE to receive its new UL TBF assignment immediately after the UE requests a channel, and thereby enable the UE to start sending RLC data blocks without having to wait the round-trip delay. The periodicity with which polls for PDAKs are sent by the network can be kept high to elicit channel requests and therefore accept predictive PUAs more quickly.

Figure 2:
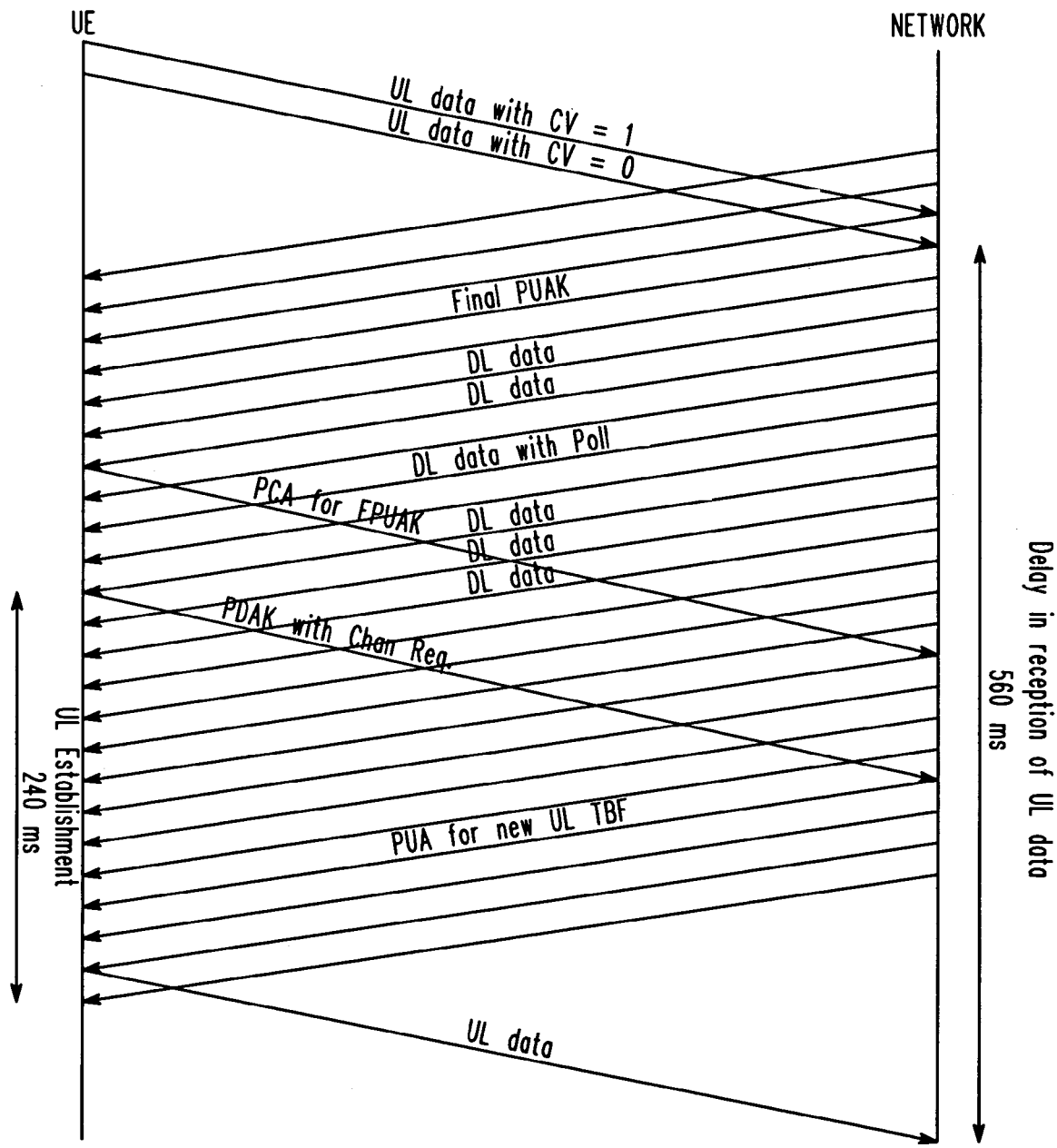
FIG. 2 is an exemplary, prior-art signaling flow diagram that depicts UL TBF release and establishment signaling during an active DL TBF.

As an example, FIG. 2 depicts a round-trip delay (PDAK with the channel request to PUA for a new UL TBF) of 9 block periods, or 9*20 ms.=180 ms. Also as an example, FIG. 3 depicts the UE receiving a PUA in the block period immediately following a PDAK with channel request. Thus, the signaling flow of FIG. 3, when compared to the prior art signaling flow of FIG. 2, illustrates a 160 ms. savings.

Recognizing that sending PUAs that are not requested may create some confusion, certain embodiments handle these situations with some combination of the following approaches. When no UL data is received for a period of time after the predictive PUA, the UL TBF is aborted. When a UL request is received in a PDAK that was sent after the predictive PUA, the predictive TBF is aborted and a regular UL TBF is established in accordance with the UL request. Finally, a new predictive UL TBF is not established until a previous one finishes normally or is aborted.

Thus, to describe some of these embodiments with reference to wireless communication system 100, RAN 121 comprises transceiver 127 and controller 125. In some embodiments, but not all, controller 125 includes a PCU while transceiver 127 includes a transceiver portion of a BTS. For the purpose of providing an example, it will be assumed that UE 101 is running an application that is supported by server 161. Therefore, UE 101 receives data from server 161 via IP network 151, packet data network 141, controller 125, transceiver 127, and a downlink communication resource of air interface 111.

After controller 125 has transmitted, via transceiver 127, all the data for UE 101 from server 161 and no additional data is ready for transmission to UE 101, controller 125 polls UE 101 for a request for an uplink communication resource. Controller 125 then transmits, via transceiver 127, one or more assignment messages to UE 101 for an uplink communication resource. These assignment messages, however, are not transmitted in response to any request from UE 101 for an uplink communication resource. Rather, they are sent predictively, anticipating that UE 101 will send a resource request in response to the poll sent earlier. By transmitting the one or more assignment messages after polling UE 101 for a resource request, UE 101 is able to receive an assignment message after it requests an uplink resource but before an assignment message in response to the request would be sent. In other words, the round-trip delay of assignment-in-response-to-request can be avoided.

In addition to or independent of sending assignment messages after all the downlink data has been sent, RAN controller 125 can attempt to predict when UE 101 will next need an uplink communication resource while the downlink data is still being sent. Controller 125 can monitor the uplink activity of UE 101 over time. When a regular pattern in that activity is present, controller 125 can detect it and begin predicting, based on the pattern, when UE 101 will next need an uplink resource. Via transceiver 127, then, controller 125 can transmit an assignment message to UE 101 to provide an uplink resource when UE 101 is predicted to next need the resource.

In general, to detect a regular pattern in the uplink activity, controller 125 can track past remote unit activity intervals and determine a variance coefficient for them. When this variance coefficient is below a threshold, controller 125 detects a regular pattern in uplink activity from which to make predictions. In detecting a pattern in activity, various activity intervals can be monitored. For example, controller 125 may track the intervals between uplink resource requests and/or the intervals between releasing a previous uplink resource and requesting the next uplink resource.

A more detailed example of these predictive approaches follows. In contrast to the first predictive approach, described above, which focused on the DDTR procedure, the approaches described next provide for PUAs being sent to the UE even when the DL TBF is transmitting real data. One will note that the small loss in DL bandwidth is expected to be more than compensated for by the savings in UL bandwidth. Thus, the overall transfer is expected to be faster.

In one embodiment, the first approach or algorithm detects the periodicity in reception of UL requests for a particular UE. This can be tracked using the UE's Temporary Logical Link Identifier (TLLI). The estimate of periodicity $I_{curr}$ (TLLI) is run through a filter, an interval filter. This interval filter maintains an array of intervals $[I_1-I_k]$, per UE, where k is a programmable parameter. These represent the last k intervals (in block periods) between UL requests from the UE. The current interval $I_{curr}$ is calculated as the mean (or median in some implementations) of elements $I_1$ to $I_k$.

The array is a sliding window and each time a new UL request is received, the window is slid by one element so that the new interval between this request and the last one is pushed into the array and the oldest interval element is pushed out. If an UL request has not arrived for a very large interval $I_{curr}$, a value of "infinity" can be pushed into the array. The value of $I_{curr}$ is then recalculated. (The value of $I_{curr}$ can be initialized to some default value if desired.)

A coefficient of variance CV is calculated for the range of values $[I_1-I_k]$. If CV is greater than a threshold $CV_{max}$, $I_{curr}$ is set to "infinity", i.e., the procedure is effectively turned off. This ensures that if the periodicity of the UL requests is not deterministic to a large extent, DL bandwidth is not wasted with predictive PUAs. A simple standard deviation variable σ can also be maintained for the same purpose.

A Block Counter (BC) is maintained per UE, which is initialized to zero and increments every block period. When BC reaches $I_{curr}$, an attempt is made to schedule an UL assignment for the particular mobile. Every time a PUA (i.e., a PUA for a predictive or a non-predictive UL TBF) is sent to the UE, it's BC is set back to zero.

A predictive TBF scheduler runs every block period for every timeslot and checks whether an UL assignment needs to be scheduled to establish a predictive UL TBF for a UE on that timeslot. It is described below:

```
For every mobile y on a timeslot x
    1) If x is a "control" timeslot for the UE
        a. Increment BC(y)
        b. If an UL TBF does not exist for UE y
            i. If BC(y) >= I_curr (y)
                1. If at least one PDAK is outstanding (at least one
                   poll has been sent for which the expected PDAK
                   time has not elapsed yet)
                    a.  Send UL assignment to UE y and start
                        predictive UL TBF
                    b.  Initialize BC(y) to zero
```

In addition, the algorithm for scheduling polls for PDAKs could be improved such that a poll would accurately be scheduled just before BC for a UE catches up with $I_{curr}$.

As the overall data rate of a transfer gets higher (e.g., as the Coding Scheme used for the GPRS transfers gets higher), the time gap between the end of one UL TBF and the request for the next UL TBF becomes very consistent, since the UE has UL data to send more frequently. In another embodiment, a second approach would involve maintaining an array of intervals $[D_1\text{-}D_k]$ similar to that in the first approach. The array captures the last k intervals between the end of an UL TBF and the request for the next UL TBF is received. A corresponding co-efficient of variance and block counter is maintained and the predictive UL TBF is established when the BC reaches the current interval $D_{cur}$.

This second approach has been found to give accurate results even with varying coding schemes in the higher data rate range. However, a combination of the above procedures could be used for maximum effect. For example, the predictive TBF could be established in accordance with the approach having the minimum covariance or deviation, while the DDTR approach can act as the default when no periodicity can be detected.

Potential benefits of some of the embodiments described include the following. In multiple WAP-type sessions, several TBFs are established in the uplink and downlink direction in quick succession. Some of the embodiments described could improve the throughput of each UL TBF and hence the overall throughput.

In an UL FTP session over GPRS, during ramp up and ramp down of the TCP window, several UL TBFs are established, typically during the Delayed Downlink TBF Release procedure. Some of the embodiments described could enable such TBFs to be established faster, improving overall throughput. The gains would be more noticeable with UL FTPs of small files, since the ramp periods account for a larger percentage of the overall time.

In a DL FTP session over GPRS, the TCP acknowledgements in the UL direction require separate UL TBFs and are fairly periodic. Some of the embodiments described could reduce establishment time of each such TBF causing overall FTP throughput to increase.

Lastly, when bad RF conditions prevail, several PDAKs are missed in the UL direction. These potentially contain Channel Requests for an UL TBF. If the network does not respond to a channel request, the mobile resends another one after the T3168 timer expires (as defined in 3GPP specification 04.60, typically 5 seconds) greatly delaying UL TBF establishment and drastically impacting throughput. Some of the embodiments described could preclude these scenarios.

Figure 4:
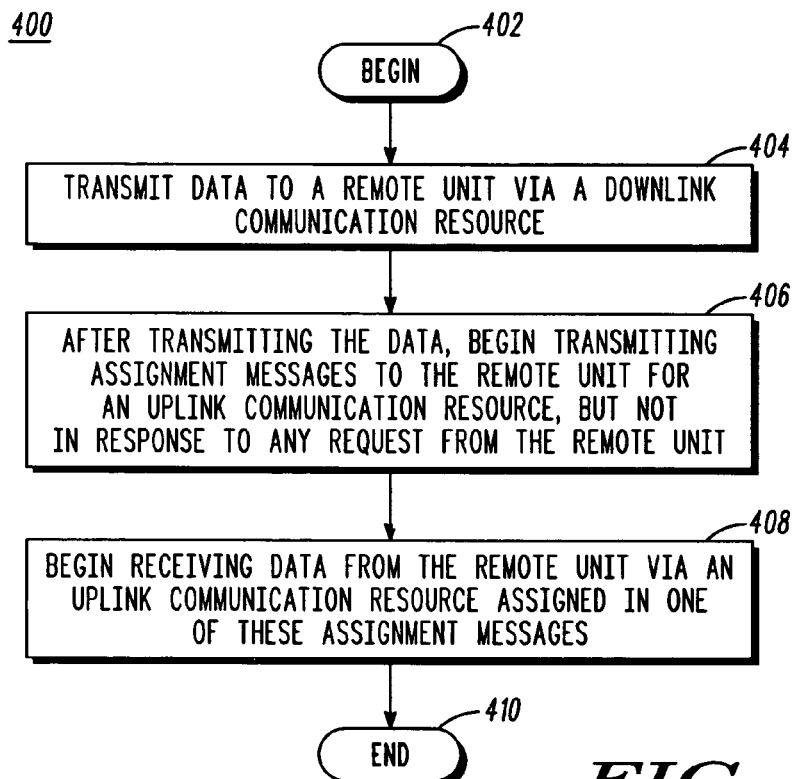
FIG. 4 is a logic flow diagram of functionality performed in accordance with multiple embodiments of the present invention.

FIG. 4 is a logic flow diagram of functionality performed in accordance with multiple embodiments of the present invention. Logic flow 400 begins (402) with a RAN transmitting (404) data to a remote unit via a downlink communication resource. After transmitting the data and with no additional data ready for transmission, the RAN begins transmitting (406) assignment messages to the remote unit for an uplink communication resource. However, these assignment messages are not transmitted in response to uplink resource requests from the remote unit. Eventually, the RAN begins receiving (408) data from the remote unit via an uplink resource assigned in one of these assignment messages, and logic flow 400 ends (410).

Figure 5:
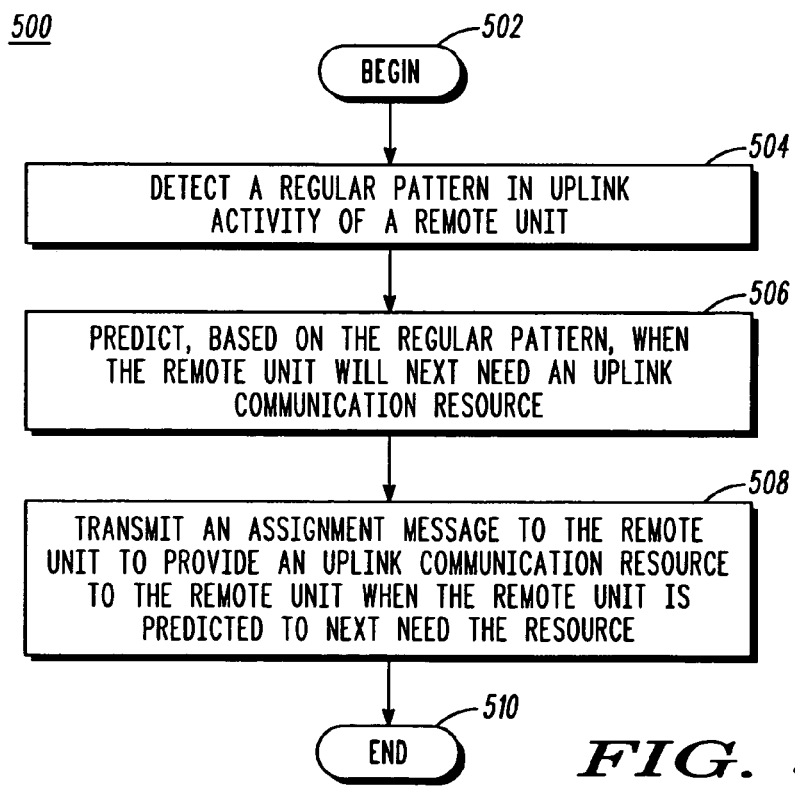
FIG. 5 is a logic flow diagram of functionality performed in accordance with some embodiments of the present invention.

FIG. 5 is a logic flow diagram of functionality performed in accordance with some embodiments of the present invention. Logic flow 500 begins (502) when a RAN detects (504) a regular pattern in uplink activity of a remote unit. The RAN then begins predicting (506), based on the regular pattern, when the remote unit will next need an uplink communication resource. When the remote unit is predicted to need an uplink resource, the RAN transmits (508) an assignment message to the remote unit to provide the uplink resource. Again however, the assignment message is not transmitted in response to uplink resource requests from the remote unit. Logic flow 500 thus ends (510).

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for predictively providing an uplink communication resource comprising:
    transmitting data to a remote unit via a downlink communication resource;
    when the data has been transmitted and no additional data is ready for transmission to the remote unit, transmitting at least one assignment message to the remote unit for an uplink communication resource, wherein the assignment message is not transmitted in response to a request from the remote unit for an uplink communication resource; and receiving data from the remote unit via an uplink communication resource assigned in an assignment message not transmitted in response to a request from the remote unit.

2. The method of claim 1, wherein transmitting the data to the remote unit via the downlink communication resource comprises transmitting the data via a downlink (DL) Temporary Block Flow (TBF) and wherein receiving the data from the remote unit via the uplink communication resource comprises receiving the data via an uplink (UL) Temporary Block Flow (TBF).

3. The method of claim 1, wherein transmitting the at least one assignment message to the remote unit for an uplink communication resource comprises when the data has been transmitted and no additional data is ready for transmission to the remote unit, beginning a Delayed DL TBF release (DDTR) procedure and transmitting the at least one assignment message during the DDTR procedure.

4. The method of claim 1, wherein transmitting the at least one assignment message to the remote unit for an uplink communication resource comprises transmitting at least one Packet Uplink Assignment (PUA) message that assigns a timeslot for an uplink (UL) Temporary Block Flow (TBF).

5. The method of claim 1, wherein transmitting the at least one assignment message to the remote unit for an uplink communication resource comprises transmitting the at least one assignment message after polling the remote unit for a request for an uplink communication resource, to thereby provide the at least one assignment message to the remote unit after the remote unit requests an uplink communication resource but before an assignment message in response to the remote unit request would be sent.

6. The method of claim 1, further comprising:

detecting a regular pattern in uplink activity of the remote unit;

predicting, based on the regular pattern, when the remote unit will next need an uplink communication resource; and transmitting an assignment message to the remote unit to provide an uplink communication resource to the remote unit when the remote unit is predicted to next need the uplink communication resource.

7. The method of claim 6, wherein detecting a regular pattern in uplink activity of the remote unit comprises determining a variance coefficient for past remote unit activity intervals.

8. The method of claim 7, wherein the activity intervals represent intervals from the group consisting of intervals between uplink communication resource requests and intervals between releasing a previous uplink communication resource and requesting a next uplink communication resource.

9. The method of claim 7, wherein transmitting the assignment message to the remote unit to provide an uplink communication resource to the remote unit when the remote unit is predicted to next need the uplink communication resource comprises transmitting the assignment message when the variance coefficient is below a threshold.

10. A radio access network (RAN) comprising:

a transceiver; and a controller, communicatively coupled to the transceiver, adapted to transmit, via the transceiver, data to a remote unit via a downlink communication resource, adapted to transmit, via the transceiver, at least one assignment message to the remote unit for an uplink communication resource, when the data has been transmitted and no additional data is ready for transmission to the remote unit, wherein the assignment message is not transmitted in response to a request from the remote unit for an uplink communication resource, and adapted to receive, via the transceiver, data from the remote unit via an uplink communication resource assigned in an assignment message not transmitted in response to a request from the remote unit.

11. A method for predictively providing an uplink communication resource comprising:

detecting a regular pattern in uplink activity of a remote unit;

predicting, based on the regular pattern, when the remote unit will next need an uplink communication resource; and transmitting an assignment message to the remote unit to provide an uplink communication resource to the remote unit when the remote unit is predicted to next need the uplink communication resource.

12. The method of claim 11, wherein detecting a regular pattern in uplink activity of the remote unit comprises determining a variance coefficient for past remote unit activity intervals.

13. The method of claim 12, wherein the activity intervals represent intervals from the group consisting of intervals between uplink communication resource requests and intervals between releasing a previous uplink communication resource and requesting a next uplink communication resource.

14. The method of claim 12, wherein transmitting the assignment message to the remote unit to provide an uplink communication resource to the remote unit when the remote unit is predicted to next need the uplink communication resource comprises transmitting the assignment message when the variance coefficient is below a threshold.

* * * * *